United States Patent [19]

Gellatly

[11] 4,012,861
[45] Mar. 22, 1977

[54] FISHING POLE HOLDER

[76] Inventor: Walter L. Gellatly, 350-35th St., Ogden, Utah 84403

[22] Filed: Dec. 22, 1975

[21] Appl. No.: 642,690

[52] U.S. Cl. .............................................. 43/15
[51] Int. Cl.$^2$ ...................................... A01K 97/10
[58] Field of Search .................................. 43/15, 16

[56] References Cited

UNITED STATES PATENTS

| | | | |
|---|---|---|---|
| 2,482,999 | 9/1949 | Bean | 43/15 |
| 2,744,351 | 5/1956 | Smith | 43/16 |
| 2,804,277 | 8/1957 | Kinder | 43/15 |
| 2,835,065 | 5/1958 | Schwartzkopf | 43/15 |
| 3,091,048 | 5/1963 | Thesz | 43/15 |
| 3,562,947 | 2/1971 | Martin | 43/15 |
| 3,837,109 | 9/1974 | DeJulio | 43/15 |

*Primary Examiner*—Warner H. Camp
*Attorney, Agent, or Firm*—B. Deon Criddle

[57] ABSTRACT

A fishing pole holder including a tubular fishing pole handle receiving member; a support spike adapted to be forced into the ground; a pivot support bracket carried by an upper end of the support spike and having a detent receiving hole therein; a detent bracket releasably fixed to the tubular support member and carrying a detent, adapted to be releasably inserted into the hole or holes provided therefor in the pivot support member; means pivotally mounting the detent bracket to the pivot support bracket; an adjustable spring securement collar attached to the upper end of the spike; a spring interconnecting the detent bracket and the adjustable spring securement collar; and cooperating limit stops on the pivot support bracket and the detent bracket to limit pivoting movement of the detent bracket relative to the pivot support bracket.

1 Claim, 4 Drawing Figures

FISHING POLE HOLDER

BRIEF DESCRIPTION OF THE INVENTION

1. Field of the Invention

This invention relates to fishing and is particularly concerned with devices for holding a fishing pole at the bank of a stream, lake, or the like, and is still more particularly concerned with fishing pole holders that will automatically set the hook in a fish taking the line attached to the fishing pole mounted in the holder.

2. Prior Art

It has long been recognized that it is sometimes desirable to use some means of securing a fishing pole in place along the bank of a river, lake or the like so that the fisherman does not need to constantly hold the pole. Perhaps the most common way of securing such a fishing pole is to use rocks and to prop the pole between rocks of suitable size. With this system, the pole frequently falls over and may be released when a fish is caught. The rocks may also cut, scratch or otherwise damage the pole. In addition, there is no way for the hook to be set in a fish unless the user watches carefully and is able to regrasp the pole and set the hook manually. A number of rod holders have been developed and are available commercially and many of these are adapted to be inserted into the ground so that they can be used adjacent to rivers, lakes, and the like. Most of the rod holders of which I am familiar merely comprise tubular handle receiving members fixed to spikes that can be driven into the ground. While these holders do a credible job of holding a pole in place, they do not provide for automatic setting of a hook on a line attached to the pole in the mouth of a fish. Various other holders have also been developed that signal a user when a fish has taken the hook so that the user can then grasp the pole firmly to set the hook. One such holder is shown for example in U.S. Pat. No. 3,371,443.

SUMMARY OF THE INVENTION

Principal objects of the present invention are to provide a pole holder that is inexpensive to construct and that can be readily used to hold a pole in position adjacent to rivers, lakes, and the like.

Still other objects are to provide such a pole holder that is easily used, light in weight, and easily carried by a fisherman.

Principal features of the invention include a tubular fishing pole handle receiving member; a support spike that is adapted to be inserted into the ground; a pivot support bracket fixed to the upper end of the support spike; a detent carrying bracket carried by the tubular handle receiving member and including a detent adapted to project into a hole in the pivot support bracket; means pivotally mounting the detent bracket to the pivot support bracket; spring means interconnecting the tubular fishing pole handle receiving member and the spike; and cooperating limit stops on the pivot support bracket and the detent bracket to limit pivoting movement of the detent bracket relative to the pivot support bracket.

Additional objects and features of the invention will become apparent from the following detailed description, taken together with the accompanying drawing showing a presently preferred embodiment of the invention.

THE DRAWING

In the drawing:

FIG. 1 is a perspective view of the fishing pole holder of the invention, with the tubular handle receiving member in its released position;

FIG. 2, a similar view with the tubular handle receiving member in its cocked position;

FIG. 3, a perspective view of the spike and components attached thereto; and

FIG. 4, an exploded perspective view of the tubular handle receiving member and the detent carrying bracket attached thereto.

DETAILED DESCRIPTION

Figure 1:
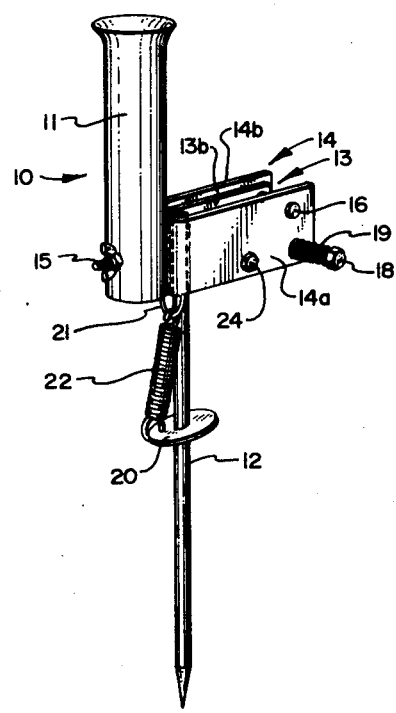

Referring now to the drawing:

In the illustrated preferred embodiment the fishing pole holder of the invention, shown generally at 10, includes a tubular fishing pole handle receiving member 11 and a spike 12 that is adapted to be inserted into the ground.

Pivot support bracket 13, comprising spaced apart parallel plates 13a and 13b is connected to the upper end of spike 12 by welding, or the like. A U-shaped detent support bracket 14 is fixed to the fishing pole handle support member 11 by a bolt 15 that also provides a stop, limiting the extent to which a fishing pole handle can be inserted into member 11. Detent support bracket 14 has legs 14a and 14b that straddle the upper end of the spike 12 and the plates 13a and 13b of the bracket 13, and a pivot pin 16 extending through the legs 14a and 14b, and plates 13a and 13b secures the detent support bracket 14 to the pivot support bracket 13 such that bracket 14 can pivot around bracket 13.

Bracket 13 has a hole 17 provided in the plate 13a thereof to receive the tip of a pin 18, forming part of the detent mechanism carried by bracket 14. Pin 18 has a head 18a thereon and a spring 19 is provided between head 18a and plate 14a. A stop 18b on the pin 18 limits penetration of the pin into hole 17 and a similar stop 18c prevents withdrawal of the pin.

Figure 2:
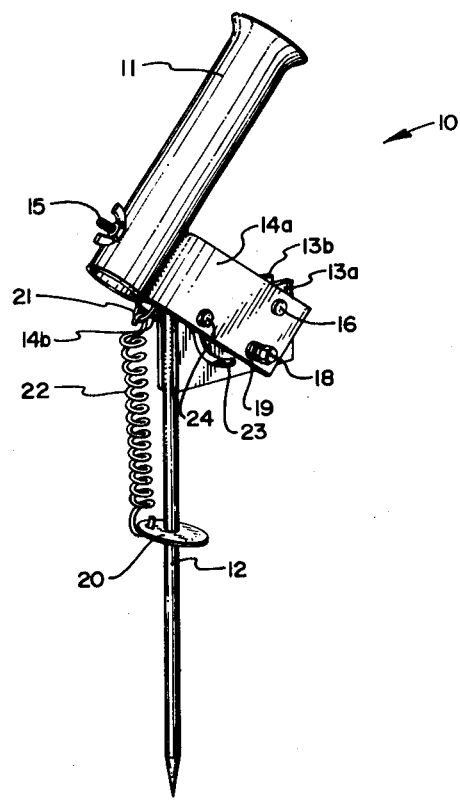
Figure 3:
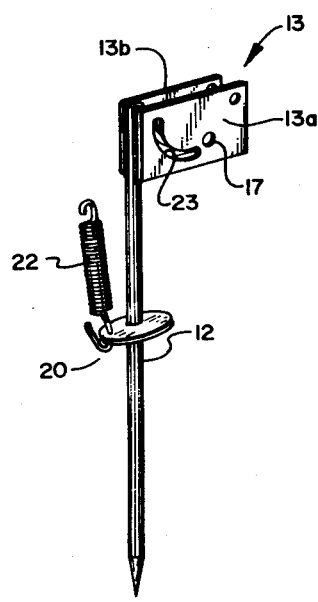
Figure 4:
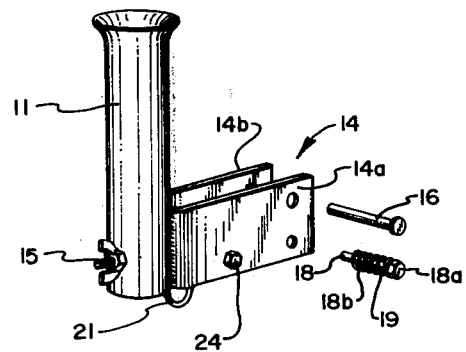

A spring securement collar 20 slidably encircles spike 12, near an upper end, and extends outwardly therefrom. An eyelet 21 is formed at the lower rear end of the detent support bracket and a spring 22 has its ends respectively hooked to the collar 20 and the eyelet 21. The spring 22 tends to pivot the member 11 and bracket 14 about bracket 13 in a counterclockwise direction, as viewed in FIGS. 1 and 2, thereby raising the end of the member 11 in which a fishing pole handle is inserted.

An arcuate slot 23 is formed in plate 13a of bracket 13 and a detent member 24 projects through the leg 14a of bracket 14 to extend into the slot 23. The slot 23 and cooperating detent member 24 thus limit the extent of pivoting movement of the detent support bracket relative to the pivot support bracket 13.

In use the spike 12 is driven into the ground and the handle of a fishing pole from which a line and hook (not shown) has been cast is inserted into the flared upper end of the upwardly extending tubular fishing pole handle receiving member 11. The pole and member 11 are then rotated about pivot pin 16 until the pin 18 is in alignment with and can be pushed into hole 17 of bracket 13. This rotation tensions spring 22 and, after the tip of pin 18 has been inserted in hole 17 and the pole and member 11 have been released, while pin 18 is held in the hole 17, the spring will pull member 11 and bracket 14 until pin 18 engages an edge of hole 17. Pin 18 is thus frictionally held against being biased out of hole 17 by spring 22.

When a fish takes the hook and pulls on the line the slightest tug will pivot the member 11 and bracket 14 around pivot pin 16 and will release the frictional engagement between the upper edge of hole 17 and pin 18. Spring 19 can then bias pin 18 out of hole 17 and spring 22 will then bias the member 11 to raise the handle receiving end of member 11 and the fishing pole mounted therein. This jerks the line and sets the hook (not shown) on the end thereof, in the fish.

The wing nut on the bolt 15 can be readily released so that the support member 11 can pivot to reduce the overall length of the holder during travel and storage.

While only one hole 17 is shown in the bracket 13, it will be apparent that additional holes can be provided, as desired, so that pin 18 can be selectively inserted therein to set the angle of the pole supported in the fishing pole handle receiving member.

The collar 20 will slide up and down the spike 12 and, once positioned, will be held in position by the binding of the collar with the spike, caused by the pull of spring 22 on one side of the collar. It is, therefore, a simple matter to move collar 20 and to thereby change the tension of spring 22 and consequently the amount of pull required to release pin 18 from a hole 17.

Although a preferred form of my invention has been herein disclosed, it is to be understood that the present disclosure is made by way of example and that variations are possible without departing from the scope of the hereinafter claimed subject matter, which subject matter I regard as my invention.

I claim:
1. A fishing pole holder comprising
   an elongate spike;
   a generally U-shaped pivot support bracket fixed to an upper end of said spike with the legs of said bracket cantilevered therefrom;
   an elongate, tubular fishing pole handle receiving member having an open handle receiving end;
   a generally U-shaped detent bracket bolted to said fishing pole handle receiving member with the legs of said bracket cantilevered therefrom and straddling the legs of the pivot support bracket;
   means pivotally connecting the legs of the detent bracket to the legs of the pivot support bracket whereby the detent bracket will pivot with respect to the pivot support bracket;
   spring means biasing the tubular handle receiving member such that the detent bracket pivots in one direction with respect to the pivot support bracket to a released position, said spring means comprising
      a spring securement collar slidably surrounding and projecting from the spike, a coil spring, means for attaching one end of said coil spring to the end of said spring securement collar, and means for attaching the other end of the spring to the detent bracket;
   detent means for locking said pivot support bracket and said detent bracket together in a cocked position wherein the spring means biasing the handle receiving member is in tension, but releasable upon a tug on the fishing pole handle receiving member in opposition to the bias of the spring means, said detent means comprising
      a hole in a leg of the pivot support bracket;
      a pin carried by and extending through a leg of the detent bracket and adapted to extend into the hole;
      a spring biasing the pin out from said hole; and
      cooperating limit means on the detent bracket and the pivot support bracket to limit the amount of pivoting of the detent support bracket relative to the pivot support bracket, said cooperating limit means comprising an arcuate slot in a leg of the support bracket and a detent member projecting from a leg of the detent bracket and into said slot whereby said detent member will move in the arcuate slot during pivoting of the detent support bracket relative to the pivot support bracket.

* * * * *